Oct. 23, 1962 W. HENNY ET AL 3,059,900
GAS TURBINE ENGINE INTERSTAGE INNER SHROUD SUSPENSION
Filed Nov. 15, 1960
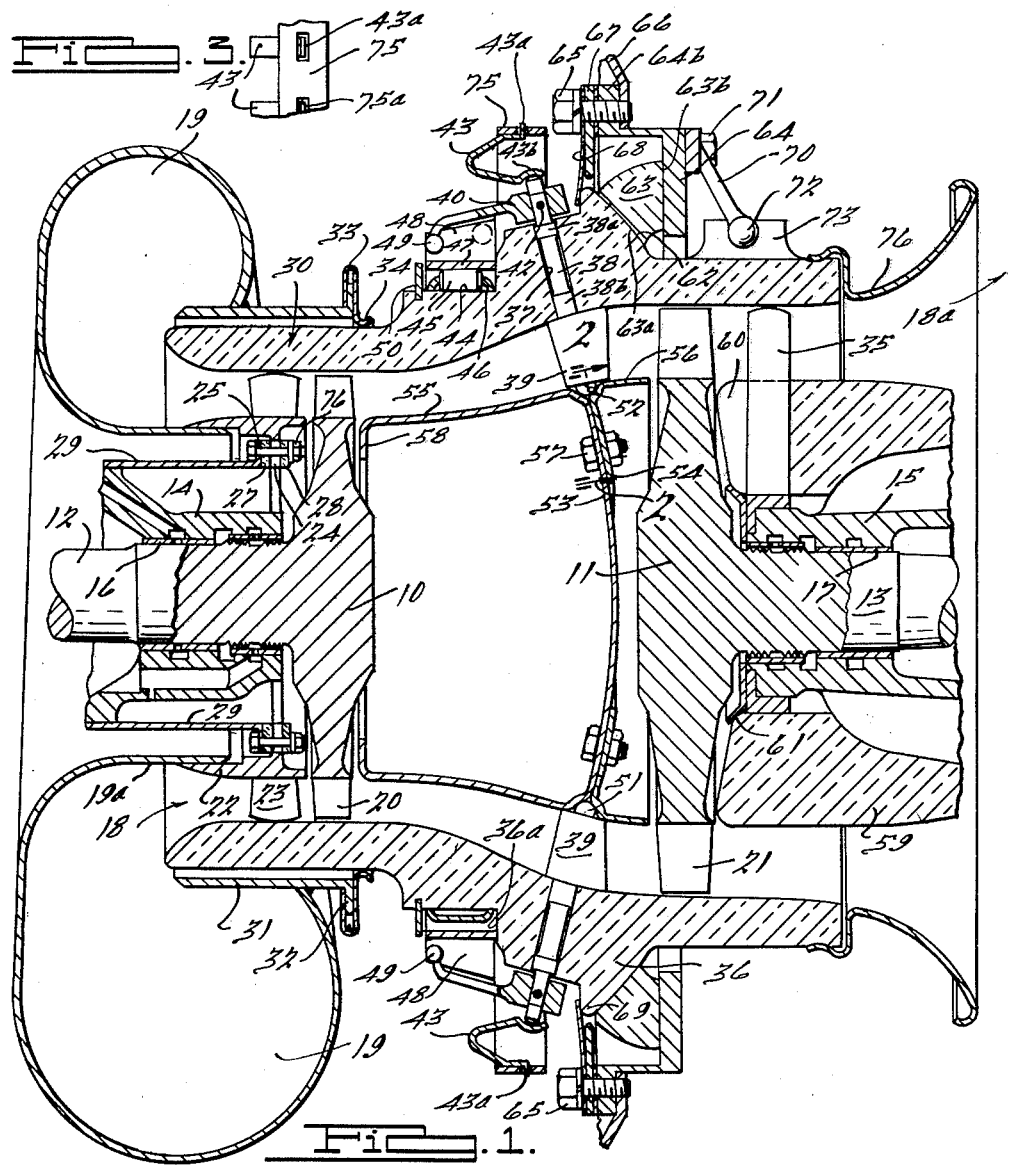
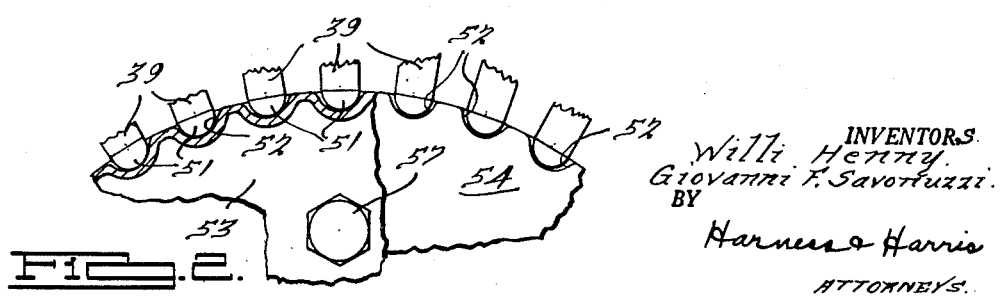
INVENTORS
Willi Henny
Giovanni F. Savonuzzi
BY
Harness & Harris
ATTORNEYS

United States Patent Office 3,059,900
Patented Oct. 23, 1962

3,059,900
GAS TURBINE ENGINE INTERSTAGE INNER SHROUD SUSPENSION
Willi Henny, Southfield, and Giovanni F. Savonuzzi, Birmingham, Mich., assignors to Chrysler Corporation, Highland Park, Mich., a corporation of Delaware
Filed Nov. 15, 1960, Ser. No. 69,320
12 Claims. (Cl. 253—39)

This invention relates to a multiple stage gas turbine engine and in particular to the annular passage for conducting motive gases between the first and second stage rotors of such an engine.

In a common type of gas turbine automobile engine, an annular conduit comprising inner and outer shrouds conveys hot motive gases to the peripheral blades of first and second coaxial rotor stages to drive the same. Within the conduit immediately upstream of the blades of the second stage rotor are a plurality of circumferentially arranged adjustable nozzles for adjusting the angle of attack of the gases against the rotor blades. Reference may be had to Huebner et al. Patent 2,795,928 for details of a gas turbine engine of the type with which the present invention is concerned.

Among the problems involved in the satisfactory production of such an engine is the provision of a feasible interstage inner shroud section and means for supporting the same between the first and second rotor stages so as to effect a minimum encumbrance to the flow of motive gases. Heretofore the interstage inner shroud section has been supported by struts or fixed blades interconnecting the inner and outer shrouds. Such supports are costly to assemble and impede the flow of motive gases. In applications where fixed interstage blades are unnecessary, the use of such blades are particularly objectionable.

An important object of the present invention is therefore to provide an improved highly efficient interstage inner shroud section and support therefor in a gas turbine engine which avoids the above problems and which is particularly simple and economical to manufacture and assemble.

Another and more specific object is to provide a two-stage gas turbine engine of the above character which is suitable for automotive use wherein the adjustable nozzles are supported by the outer shroud for rotation about an axis transverse to the axis of the coaxial rotor stages and annular gas passage. The inner end of each nozzle carries a rounded bearing element which seats against the outer periphery of the interstage inner shroud section and is resiliently urged against the latter, whereby the inner shroud section is supported at a plurality of locations spaced around its circumference. Slight variations in the resilient contact between the various bearing elements and the inner shroud section are averaged out around the latter's circumference and are rendered inconsequential.

Another object is to provide such a structure wherein the inner shroud section comprises two annular parts arranged coaxially end to end. The juxtaposed ends of the annular shroud parts terminate in mating inturned flanges suitably secured together at circumferentially spaced locations adjacent the bearing elements. Also at the region of the flanges, the two annular inner shroud parts are provided with recesses or sockets which receive the ball elements resiliently seated therein to support the inner shroud section. By virtue of such a construction, the juxtaposed edges of the two annular shroud parts are readily arranged in axial alignment to enable unobstructed flow for the motive gases in the annular passage and the interstage inner shroud is firmly held in coaxial alignment with the rotors.

Another object is to provide such a structure wherein one of the two annular parts of the inner shroud section comprises a dished member closed at the region of the ball members by a baffle which both reinforces the annular inner shroud section and prevents axial flow of the motive gases therethrough.

Other objects of this invention will appear in the following description and appended claims, reference being had to the accompanying drawings forming a part of this specification wherein like reference characters designate corresponding parts in the several views.

FIGURE 1 is a fragmentary mid-sectional view through a two-stage gas turbine engine embodying the present invention, taken along the common axis of the engine's rotors.

FIGURE 2 is a fragmentary enlarged transverse sectional view taken in the direction of the arrows substantially along the line 2—2 of FIGURE 1.

FIGURE 3 is a detail of the radial biasing means applied to the gas turbine guide vanes.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example comprising a gas turbine engine suitable for automotive use having coaxial first and second stage rotors 10 and 11 secured to separate coaxial shafts 12 and 13 respectively, which are journalled in separate supports 14 and 15 suitably secured to fixed portions of the vehicle engine. Bearings 16 and 17 carried by the supports 14 and 15 rotatably support the shafts 12 and 13. The latter shaft may be suitably connected through a speed reduction gearing to the driving wheels of the vehicle, whereas the shaft 12 is suitably connected with an air compressor for supplying combustion supporting air to the engine.

Air from the compressor is discharged to a combustion chamber where fuel is added and burned in accordance with customary practice, the combustion products being then discharged into a spiral collecting chamber having an annular inner wall portion 19a. From the collecting chamber 19 the hot motive gases are directed through an annular gas passage 18 to the peripheral blades 20 and 21 of the rotors 10 and 11 respectively, and are then exhausted at 18a.

The annular gas passage 18 is defined by a number of inner and outer shroud sections. One of the inner shroud sections comprises a plurality of circumferentially extending shroud segments 22 having their leftward axially extending edges closely overlying the juxtaposed annular wall portion 19a and having their rightward axial edges terminating adjacent the rotor 10 at the base of the blades 20. Each of the shroud segments 22 carries a plurality of circumferentially spaced radially extending fixed flow directing nozzles 23 arranged immediately upstream of the blades 20. Extending radially inwardly from each shroud segment 22 are one or more integral stems 24 clamped to an annular nozzle supporting flange 25 by a plurality of bolt and nut assemblies 26. Preferably in order to minimize heat transfer from the stems 24 to the flange 25, the bolt and nut assemblies 26 are arranged between adjacent circumferentially spaced stems 24. Also heat insulating gaskets 27 and 28 are interposed between the stems 24 and juxtaposed portions of support 25 and the nuts of the assemblies 26 respectively. The support 25 comprises an integral flange of a tubular heat dissipating body 29 which extends coaxially around the shaft 12 and is suitably secured to the support 14 at a location spaced axially from the stems 24.

Extending closely around the outer peripheries of the blades 20 and 21 is an annular outer shroud section 30 which may be formed of ceramic or other material having a comparatively low coefficient of thermal expansion. The left end of shroud 30 is supported by sliding contact with the rounded outer ends of the nozzles 23 which are preferably formed spherically about a radius approximately equal to the radius of the inner surface of the outer shroud 30 at its region of contact with the blades 23.

Around the outer periphery of the left end of shroud 30 and spaced radially therefrom is a sleeve 31 which is suitably secured to the wall of the aforesaid spiral collecting chamber 19. The right end of sleeve 31 terminates in an annular radial flange 32 confined within an annular channel seal 33 having an annular rounded outturned portion 34 resiliently engaging the outer surface of shroud 30 in fluid sealing relation. The right end of shroud 30 is supported by sliding contact with the rounded radially outer ends of a plurality of circumferentially spaced fixed struts 35 suitably secured to support 15. Similarly to the outer ends of the nozzles 23, the outer ends of the struts 35 are formed spherically about a radius approximately equal to the radius of the inner surface of shroud 30 at its region of contact with the struts 35.

An intermediate thickened annular portion 36 of the shroud 30 is provided with a plurality of circumferentially spaced bores 37 for a corresponding plurality of spindles 38 having their axes contained in a conical envelope perpendicular to the adjacent inner surface of shroud 30. Each spindle 38 is journalled by means of integral upper and lower bearing surfaces 38a and 38b within its bore 37 for pivotal movement about its generally radial axis which intersects the axis of rotors 10 and 11. The bearing surfaces 38a and 38b also serve as annular gas seals to prevent flow of the motive gases through the bores 37 from the passage 18. In the present instance, the spindles 38 are uniformly spaced circumferentially approximately ten degrees of arc. Secured to the inner end of each spindle 38 to pivot therewith within the passage 18 and in advance of the rotor blades 21 is an adjustable nozzle blade 39 pivotally adjustable about the axis of the spindle 38 when the latter is pivoted.

The outer surface of the enlargement 36 around each bore 37 is spaced from the hub 40 of a swinging arm 41. Each hub 40 is secured by a pin 42 to an upper extension of the associated spindle 38 to pivot therewith. A separate spring arm 43 suitably supported as described below, yieldingly engages the rounded outer end of each spindle 38 and urges the latter radially inward.

Adjacent the leftward portion of the enlargement 36, the shroud 30 is provided with a cylindrical platform 44 for a few circumferentially spaced rollers 45 maintained in their circumferentially spaced relationship by an annular bearing race 46. A ring 47 is rotatably mounted on the rollers 45 and carries a plurality of pairs of circumferentially spaced plates 48. The plates 48 of each pair extend parallel to each other to provide an axial and radially outwardly opening slot having the ball end 49 of one of each of the swinging arms 41 snugly confined therein, so that upon rotation of ring 47, all of the swinging arms 41 and associated spindles 38 and adjustable nozzle blades 39 will be pivoted in unison about the axes of the associated spindles. An annular retainer 50 suitably secured to the enlargement 36 prevents leftward movement of rollers 45 and ring 47 and retains the same adjacent an annular retaining wall 36a of the enlargement 36.

Extending coaxially with each spindle 38 from the radial inner edge of the associated blade 39 is an integral round shroud supporting bearing element 51 resiliently maintained in seated position within a mating socket or recess 52 formed partly in each of a pair of juxtaposed flanges 53 and 54 of intermediate inner annular shroud sections 55 and 56 respectively.

The flanges 53 and 54 are secured together, as for example by a plurality of bolts 57 arranged around the axis of the rotors 10 and 11, so as to hold the shroud sections 55 and 56 in coaxial alignment to complete a unitary intermediate inner shroud section. The flange 54 terminates slightly inwardly of the bolts 57, whereas the flange 53 comprises a plate or baffle entirely closing the interior of the annular shroud section 55, 56 to prevent axial passage of the motive gases therethrough.

In the present instance, the radius of curvature of each of the sockets 52 is slightly greater than the radius of curvature of the bearing element 51 therein, so that the latter seats at a point contact against the base of its socket 52. However a typical ball and socket type relationship between elements 51 and sockets 52 could be employed where desired. By virtue of the large number of elements 51 spaced uniformly around the circumference of the inner shroud section 55, 56 and urged radially inwardly against the latter by the springs 43, the intermediate shroud section 55, 56 is firmly held in coaxial alignment with the outer shroud 30 and rotors 10 and 11.

The shroud section 55 extends axially leftward to adjacent the base of the blades 20 and terminates in an annular inturned reinforcing flange 58. The entire section 55 thus comprises a cup-shaped member having an integral base 53 which provides the baffle to prevent axial bypass flow of the motive gases and also to resist the radially inwardly directed force applied by the springs 43. The shroud section 56 extends axially to the right and terminates adjacent the rotor 11 at the base of the blades 21.

The outer shroud 30 may extend annularly to the end of the gas passage 18. However to facilitate assembly of the structure described below, the right end of the outer shroud comprises an annular extension 76 suitably clamped over the right end of shroud 30. Extending from adjacent the right face of rotor 11 at the base of the blades 21 is an inner annular shroud section 59 having radial openings 60 for passage of the struts 35 freely therethrough and supported at its leftward edge by a fixed conical support 61, which in turn is suitably secured to support 15. Reference may be had to copending applications of applicants' assignee, Serial No. 40, 951, filed July 5, 1960, and Serial No. 34,172, filed June 6, 1960, for further details of the structure described thus far.

In order to accommodate limited thermally induced displacement of the supports 14 and 15 from their coaxial alignment during operation of the engine, the thickened portion 36 of shroud 30 is provided with a spherical surface 62 comprising an annular zone coaxial with the shroud 30. An annular adjustment member 63 having a spherical zonal surface 63a mating concentrically with the surface 62 and slidably engaging the latter is also provided with an annular surface 63b coaxial with the surface 63a and extending generally perpendicularly to the axis of the rotor 11. The member 63 is supported between the surface 62 and the annular surface 64a of an annular bracket 64 of L-shaped section. In its centered position, the surface 64a extends perpendicularly to the axis of the rotors 10 and 11 and is provided on the radially inwardly projecting annular flange of the bracket 64 which is coaxial with the latter's axis. The radially outwardly extending annular flange 64b of bracket member 64 is secured by a plurality of bolts 65 to a fixed bulkhead 66 of the engine frame. An annular backup plate 67 and spring seal 68 are also secured to the flange 64b by the bolts 65, the radially inner portion of seal 68 resiliently engaging an annular projection 69 of shroud 30 in fluid sealing relation tending to urge shroud 30 and its surface 62 toward the mating spherical surface 63a of the adjustment member 63.

As illustrated, each spring arm 43 recurves outwardly and terminates in a tongue 43a of flattened cross section secured within an elongated opening 75a in a floating ring 75 coaxial with the rotors 10 and 11. The inner end of the spring arm 43 is provided with a downwardly opening pocket 43b which receives the rounded outer tip of the stem 38 to prevent accidental disengagement between the associated stem 38 and spring arm 43. By virtue of the flattened spring end 43a, the spring arm 43 is retained in substantially fixed relationship with respect to the supporting ring 75. The springs 43 are stressed to press radially outwardly on the ring 75 and radially inwardly on the stems 38, so that the combined radial forces of all the spring arms 43 spaced around the circumerence of the ring 75 hold the latter in position. Thus the springs 43 and ring 75 mutually support each other independently of the fixed frame structure 66 of the engine.

It is apparent that limited radial shifting of either support 14 or 15 with respect to the other will result in a corresponding cocking of the shroud 30 on the spherical outer ends of the supports 23 and 35. This movement is permitted and accompanied by a corresponding sliding movement between the spherical surfaces 62 and 63a and between the parallel radial surfaces 63b and 64a. In this regard, the median tangent of surface 62 meets the axis of shroud 30 at approximately a 45° angle so as to achieve a moderate compromise in the extent of adjustment movements of the surfaces 62 and 64a with respect to their mating surfaces 63a and 63b.

In order to resist rotational thrust on the shroud 30 resulting from the impact of the motive gases against the nozzle blades 39, a bracket arm 70 is secured by a pair of bolts 71 to the bracket 64. The arm 70 extends radially toward shroud 30 and terminates in a ball portion 72 confined between a pair of parallel bosses 73 integral with the shroud section 30. The confronting surfaces of the bosses 73 snugly engage the ball 72 and extend parallel to a plane containing the axes of shroud 30 and of arm 70 when these are in their centered positions. The ball portion 72 is spaced radially from the body of the shroud 30 to enable limited radial and axial movement of the latter resulting from thermal distortion affecting the axial alignment of the supports 14 and 15, but prevents rotational movement of the shroud 30 about its axis.

We claim:

1. In a gas turbine engine having first and second rotors, an annular passage comprising inner and outer shrouds for conducting motive gases to said rotors, a plurality of adjustable nozzles spaced circumferentially within said passage immediately upstream of said second rotor, means on said outer shroud adjustably supporting said nozzles, each nozzle having a radially inwardly projecting stem at its inner end, said inner shroud including an intermediate section spacing said rotors, said intermediate section providing a plurality of seats for said stems respectively, the radially inner portion of each stem being a bearing surface seated against its respective seat, resilient means yieldingly urging each nozzle radially inwardly to maintain the bearing surface of the associated stem seated at its respective seat, the engagement between said bearing surfaces and seats comprising the sole support for said intermediate section.

2. In a gas turbine engine having first and second rotors, an annular passage comprising inner and outer shrouds for conducting motive gases to said rotors, a plurality of adjustable nozzles spaced circumferentially within said passage immediately upstream of said second rotor, means on said outer shroud adjustably supporting said nozzles, each nozzle having a radially inwardly projecting stem at its inner end, said inner shroud including an intermediate section comprising a pair of annular parts spacing said rotors and having juxtaposed edges secured together at locations adjacent the stems of said nozzles, said intermediate section providing a plurality of seats for said stems respectively, the radially inner portion of each stem being a bearing surface seated against its respective seat, resilient means yieldingly urging each nozzle radially inwardly to maintain the bearing surface of the associated stem seated at its respective seat, thereby to support said intermediate section at a plurality of circumferentially spaced locations, one of said annular parts having a transversely extending plate at the region of said seats, said plate closing the interior of said intermediate section to prevent axial flow of gases therethrough and also reinforcing said intermediate section to resist the resilient force urging said nozzles radially inward.

3. In a gas turbine engine having first and second rotors, an annular passage comprising inner and outer shrouds for conducting motive gases to said rotors, a plurality of adjustable nozzles spaced circumferentially within said passage immediately upstream of said second rotor, means on said outer shroud adjustably supporting said nozzles, each nozzle having a radially inwardly projecting stem at its inner end, said inner shroud including an intermediate section comprising a pair of annular parts spacing said rotors, said annular parts having juxtaposed radially inwardly directed flanges adjacent said stems and secured together, the flange of one of said annular parts comprising a transversely extending plate closing the interior of said intermediate section to prevent axial flow of gases therethrough, said intermediate section providing a plurality of seats for said stems respectively, the radially inner portion of each stem being a bearing surface seated against its respective seat, resilient means yieldingly urging each nozzle radially inwardly to maintain the bearing surface of the associated stem seated at its respective seat, thereby to support said intermediate section at a plurality of circumferentially spaced locations, said plate reinforcing said intermediate section to sustain the resilient force urging said nozzles radially inwardly.

4. In a gas turbine engine having first and second rotors, an annular passage comprising inner and outer shrouds for conducting motive gases to said rotors, a plurality of adjustable nozzles spaced circumferentially within said passage immediately upstream of said second rotor, means on said outer shroud adjustably supporting said nozzles, each nozzle having a radially inwardly projecting stem at its inner end, said inner shroud including an intermediate section comprising a pair of annular parts spacing said rotors and having juxtaposed edges secured together at locations adjacent the stems of said nozzles, said intermediate section providing a plurality of radially inwardly recessed seats for said stems respectively, a portion of each seat being recessed into each of said juxtaposed edges, the radially inner portion of each stem being a rounded bearing surface seated against its respective seat, resilient means yieldingly urging each nozzle radially inwardly to maintain the bearing surface of the associated stem seated at its respective seat, thereby to support said intermediate section at a plurality of circumferentially spaced locations.

5. In a gas turbine engine having first and second rotors, an annular passage comprising inner and outer shrouds for conducting motive gases to said rotors, a plurality of adjustable nozzles spaced circumferentially within said passage immediately upstream of said second rotor, means on said outer shroud adjustably supporting said nozzles, each nozzle having a radially inwardly projecting stem at its inner end, said inner shroud including an intermediate section comprising a pair of annular parts spacing said rotors, said annular parts having juxtaposed radially inwardly directed flanges adjacent said stems and secured together, the flange of one of said annular parts comprising a transversely extending plate closing the interior of said intermediate section to prevent axial flow of gases therethrough, said intermediate section providing a plurality of radially inwardly recessed seats for said stems respectively, the radially inner portion of each stem being a rounded bearing surface seated against its respective seat, resilient means yieldingly urging each nozzle radially inwardly to maintain the bearing surface of the associated stem seated at its respective seat, thereby to support said intermediate section at a plurality of circumferentially spaced locations.

6. In a gas turbine engine having a rotor, passage means for conducting motive gases to said rotor including an outer wall and an annular inner shroud section, a plurality of adjustable nozzles adjacent said rotor and spaced circumferentially around the axis of said rotor, each nozzle having a rounded element at a radially inner end, the rounded elements of said nozzles being seated against said inner shroud section, and resilient means yieldingly urging said nozzles radially inwardly to maintain said elements seated against said inner shroud section to support the same at a plurality of locations spaced around the latter's circumference.

7. In a gas turbine engine having a rotor, passage means for conducting motive gases to said rotor including an outer wall and an annular inner shroud section, a plurality of adjustable nozzles journaled in said outer wall adjacent said rotor and spaced circumferentially around the axis of said rotor, each nozzle being rotatably adjustable about an axis transverse to the axis of said rotor and having a rounded element at a radially inner end coaxial with the axis of adjustment of the nozzle, the rounded elements of said nozzles being seated against said inner shroud section, and resilient means yieldingly urging said nozzles radially inwardly to maintain said elements seated against said inner shroud section to effect the sole support for the same at a plurality of locations spaced around the latter's circumference.

8. In a gas turbine engine having a rotor, passage means for conducting motive gases to said rotor including an outer wall and an annular inner shroud section, a plurality of adjustable nozzles adjacent said rotor and spaced circumferentially around the axis of said rotor, each nozzle being rotatably adjustable about an axis transverse to the axis of said rotor and having a rounded element at a radially inner end coaxial with the axis of adjustment of the nozzle, the rounded elements of said nozzles being seated against said inner shroud section, and resilient means yieldingly urging said nozzles radially inwardly to maintain said elements seated against said inner shroud section to effect the sole support for the same at a plurality of locations spaced around the latter's circumference, said inner shroud section comprising two coaxial annular parts arranged edge to edge and having radially inturned flanges at their juxtaposed edges respectively secured together adjacent said locations, each of said elements being seated at a seat formed partially in each of said inner shroud parts.

9. In a gas turbine engine having a rotor, passage means for conducting motive gases to said rotor including an outer wall and an annular inner shroud section, a plurality of adjustable nozzles adjacent said rotor and spaced circumferentially around the axis of said rotor, each nozzle being rotatably adjustable about an axis transverse to the axis of said rotor and having a rounded element at a radially inner end coaxial with the axis of adjustment of the nozzle, the rounded elements of said nozzles affording bearing surfaces seated against said inner shroud section, and resilient means yieldingly urging said nozzles radially inwardly to maintain said elements seated against said inner shroud section to support the same at a plurality of locations spaced around the latter's circumference.

10. In a gas turbine engine having a rotor, passage means for conducting motive gases to said rotor including an outer wall and an annular inner shroud section, a plurality of adjustable nozzles adjacent said rotor and spaced circumferentially around the axis of said rotor, each nozzle being rotatably adjustable about an axis transverse to the axis of said rotor and having a rounded element at a radially inner end coaxial with the axis of adjustment of the nozzle, the rounded elements of said nozzles affording bearing surfaces seated against said inner shroud section, and resilient means yieldingly urging said nozzles radially inwardly to maintain said elements seated against said inner shroud section to support the same at a plurality of locations spaced around the latter's circumference, said inner shroud section comprising two coaxial annular parts arranged edge to edge and having radially inturned flanges at their juxtaposed edges respectively secured together adjacent said locations, the flange of one of said annular parts comprising a transversely extending plate closing the interior of said shroud section to prevent axial flow of gases therethrough and to resist the resilient force urging said elements against said shroud section.

11. In a gas turbine engine having a rotor, passage means for conducting motive gases to said rotor including an outer wall and an annular inner shroud section, a plurality of adjustable nozzles adjacent said rotor and spaced circumferentially around the axis of said rotor, each nozzle being rotatably adjustable about an axis transverse to the axis of said rotor and having a rounded element at a radially inner end coaxial with the axis of adjustment of the nozzle, the rounded elements of said nozzles being seated against said inner shroud section, and resilient means yieldingly urging said nozzles radially inwardly to maintain said elements seated against said inner shroud section to support the same at a plurality of locations spaced around the latter's circumference, each element being seated within a depression in said inner shroud section.

12. In a gas turbine engine having a rotor, passage means for conducting motive gases to said rotor including an outer wall and an annular inner shroud section, a plurality of adjustable nozzles mounted in said outer wall adjacent said rotor and spaced circumferentially around the axis of said rotor, each nozzle being rotatably adjustable about an axis transverse to the axis of said rotor and having a rounded element at a radially inner end coaxial with the axis of adjustment of the nozzle, the rounded elements of said nozzles affording bearing surfaces seated against said inner shroud section, and resilient means yieldingly urging said nozzles radially inwardly to maintain said elements seated against said inner shroud section to effect the sole support for the same at a plurality of locations spaced around the latter's circumference, each element being seated within a depression in said inner shroud section, said inner shroud section comprising two coaxial annular parts arranged edge to edge and having radially inturned flanges at their juxtaposed edges respectively secured together adjacent said locations, the flange of one of said annular parts comprising a transversely extending plate closing the interior of said shroud section to prevent axial flow of gases therethrough and to resist the resilient force urging said elements against said shroud section.

References Cited in the file of this patent

UNITED STATES PATENTS

| | | |
|---|---|---|
| 1,036,183 | Bruman | Aug. 20, 1912 |
| 2,399,046 | Larrecq | Apr. 23, 1946 |
| 2,402,418 | Kroon | June 18, 1946 |
| 2,445,661 | Constant et al. | July 20, 1948 |
| 2,879,029 | Wienola | Mar. 24, 1959 |
| 2,945,672 | Wagner et al. | July 19, 1960 |
| 2,955,744 | Hemsworth | Oct. 11, 1960 |
| 2,960,306 | Collman et al. | Nov. 15, 1960 |
| 2,976,015 | Gilbert | Mar. 21, 1961 |

FOREIGN PATENTS

| | | |
|---|---|---|
| 1,114,461 | France | Dec. 19, 1955 |
| 1,169,823 | France | Sept. 15, 1958 |